UNITED STATES PATENT OFFICE.

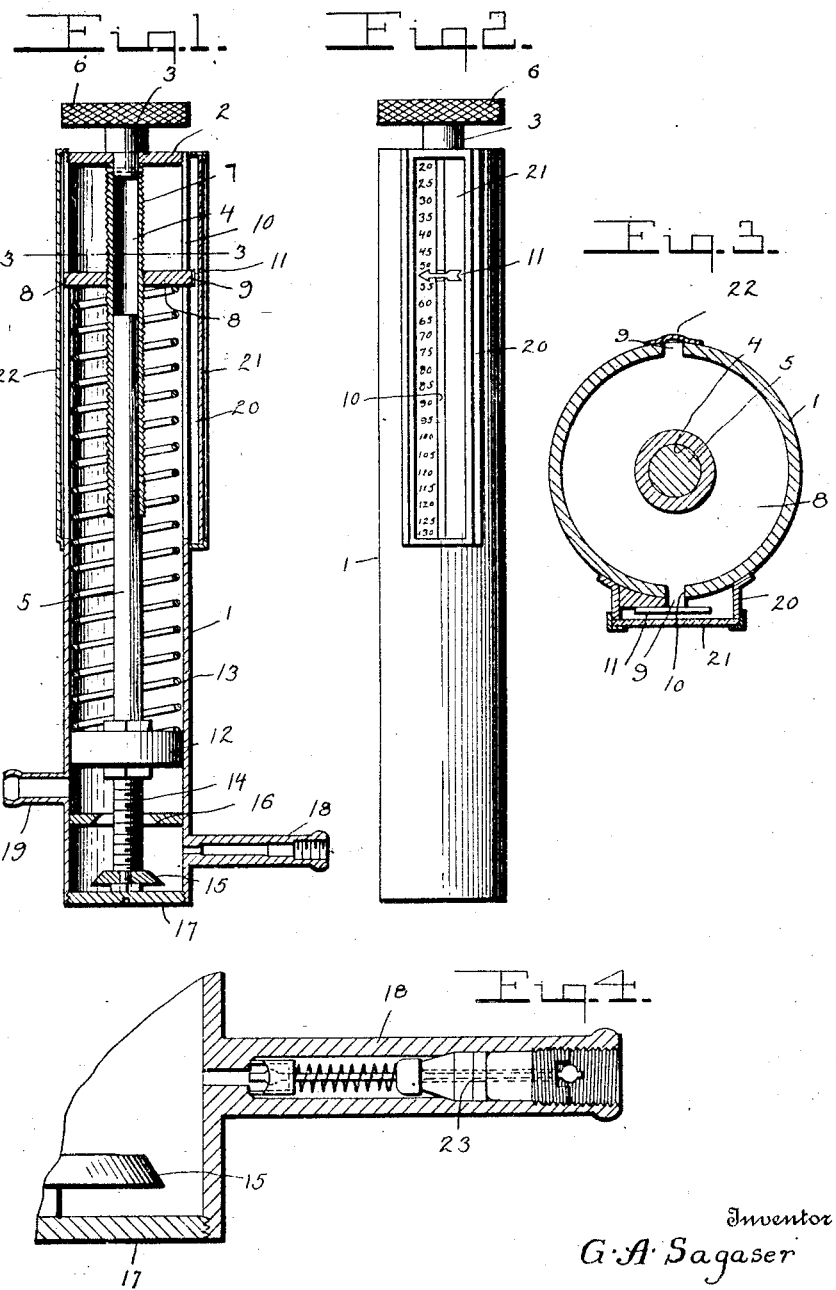

GEORGE A. SAGASER, OF HANFORD, CALIFORNIA.

AIR-PRESSURE GAGE.

1,286,119.   Specification of Letters Patent.   Patented Nov. 26, 1918.

Application filed August 25, 1916. Serial No. 116,834.

*To all whom it may concern:*

Be it known that I, GEORGE A. SAGASER, a citizen of the United States, residing at Hanford, in the county of Kings and State of California, have invented certain new and useful Improvements in Air-Pressure Gages; and I do hereby declare the following to be a full, clear, and exact description of the invention, such as will enable others skilled in the art to which it appertains to make and use the same.

This invention relates to improvements in an automatic air pressure gage and has for its primary object the position of means for automatically cutting off air to a tire from an air source after reaching a given degree of pressure to prevent over inflating of the tire.

Another object of this invention is to provide a cylinder having a valve located therein and which is normally held open to allow air to pass therethrough into a tire until a given degree of pressure has been reached which automatically seats the valve and cuts off the air supply.

A further object of this invention is to provide means whereby the resistance of the valve against the air pressure may be regulated, so that the device may be readily set for various degrees of air pressure, whereby the device may be used in connection with tires requiring different amounts of air pressure.

A still further object of this invention is the provision of an automatic air pressure gage of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a vertical sectional view of an automatic air pressure gage, constructed in accordance with my invention.

Fig. 2 is a front elevation of the same.

Fig. 3 is a transverse sectional view taken on the line 3—3 of Fig. 1, and

Fig. 4 is a fragmentary detail sectional view of a modified form of air intake to the cylinder.

Referring in detail to the drawing, the numeral 1 indicates a cylinder having threaded to its upper end a cap 2, in which is journaled a rod 3, the lower end of which is hollow as illustrated at 4 to slidably receive a plunger rod 5. A nut 6 is secured to the upper end of the rod 3 and has its periphery roughened to facilitate an efficient hand grip for rotating the rod 3 within the cap 2. The hollow portion of the rod 3 is externally screw threaded as illustrated at 7 and has threaded thereon a washer 8. The washer 8 has formed thereon oppositely disposed lugs 9 which extend through the elongated slot 10 formed within the cylinder 1 and disposed oppositely to each other to prevent rotation of the washer 8 upon the rod 3 when within the cylinder 1. One of the lugs 9 has secured thereto an arrow 11 to coöperate with a scale arranged along the cylinder 1 adjacent one of the slots 10.

A plunger 12 is secured to the lower end of the plunger rod 5 and has seated thereon a coil spring 13 which bears against the washer upon the under face thereof as clearly illustrated in Fig. 1 for urging the plunger 12 downwardly within the cylinder 1. A valve stem 14 is threaded to the plunger 12 and has secured to its lower end a valve 15 adapted to coöperate with a valve seat 16 formed within the lower end of the cylinder 1. The lower end of the cylinder 1 is closed by a removable cap 17.

An inlet tube 18 is formed on the cylinder 1 at a point intermediate the valve seat 16 and the removable cap 17 for connection with an air supply tank or the like for allowing air to enter the cylinder. An outlet tube 19 is secured to the cylinder 1 at a point above the valve seat 16 and is connected in any suitable manner with a tire valve of a tire for allowing the air which enters within the cylinder from the inlet tube 18 to pass into the tire.

Suitable guide strips 20 are secured upon the cylinder 1 adjacent each edge of one of the slots 10 and has slidable therein a glass plate 21 for covering and protecting the arrow 11 and preventing dirt and other foreign matter from entering the cylinder. A protective plate 22 is secured to the cylinder 1 upon each side of the other slot 10 to prevent dirt and other foreign matter from entering the last mentioned slot and into the cylinder.

In operation, the arrow 11 carried by the washer 8 is moved to the desired number upon the scale on the cylinder by rotating the washer 8 upon the rod 3 to regulate the tension of the spring 13 to correspond with the pressure indicated by the arrow. The spring 13 normally holds the valve 15 unseated from the valve seat 16 and the inlet tube 18 is then connected to the air supply (not shown) in any suitable manner and the air passes into the cylinder and out through the outlet tube 19 to a tire. When the pressure within the tire reaches the degree set by the washer 8 and indicated by the arrow 11, a corresponding pressure will be within the cylinder against the plunger 12, overcoming the resistance of the spring 13 and forcing the plunger 12 upwardly seating the valve 15 against the valve seat 16, cutting off the supply of air, thereby obviating the danger of over inflating the tire.

When this device is used in connection with an ordinary air pump, the inlet tube 18 is so constructed upon the interior thereof to receive an ordinary self-closing valve 23, whereby when the air is forced within the cylinder by the pump, it will be prevented from returning to the pump by the valve 23, thus facilitating easy pumping of the pump as the pressure of air within the cylinder is prevented from returning to the pump, when the pump is on its dead stroke.

While I have shown and described the preferred embodiment of my invention, it will be understood that minor changes in construction, combination and arrangement of parts may be made without departing from the spirit and scope of the invention as claimed.

Having thus described my invention what I claim is:—

An air pressure gage comprising a cylinder having oppositely disposed elongated slots in its upper end, caps closing the upper and lower ends of the cylinder, a hollow externally screw threaded rod rotatably mounted in the upper cap and having its lower end disposed downwardly within the cylinder, a disk threaded on the rod and engaging the wall of the cylinder, diametrically opposed guide lugs formed upon the disk and projecting through the slots of the cylinder to hold the same against rotation, a plunger rod slidably mounted within the hollow rod, a plunger carried by the rod, a coil spring interposed between the plunger and the disk for normally urging the plunger downwardly, a valve seat formed within the cylinder at a point above the lower cap, a valve secured to the lower end of the rod, an inlet pipe formed upon the cylinder at a point between the valve seat and the lower cap, an outlet cap formed upon the cylinder at a point above the valve seat, a graduated plate carried by the cylinder adjacent to one edge of one of the slots, and a pointer carried by one of the lugs, as and for the purpose specified.

In testimony whereof I affix my signature in presence of two witnesses.

GEORGE A. SAGASER.

Witnesses:
J. D. STEWART,
D. C. WILLIAMS.

Copies of this patent may be obtained for five cents each, by addressing the "Commissioner of Patents, Washington, D. C."